United States Patent
Kaspar (10) Patent No.: US 6,341,705 B1
(45) Date of Patent: Jan. 29, 2002

(54) CRANE VEHICLE

(75) Inventor: Ernst Kaspar, Danziger Strasse 29, 89597 Munderkingen (DE)

(73) Assignees: Compact Truck AG, Zug (CH); Franz Lutz, Ehingen; Ernst Kaspar, Munderkingen, both of (DE)

( * ) Notice: Subject to any disclaimer, the term of this patent is extended or adjusted under 35 U.S.C. 154(b) by 0 days.

(21) Appl. No.: 09/453,560

(22) Filed: Dec. 3, 1999

(30) Foreign Application Priority Data

Dec. 9, 1998 (EP) .......................... 98123428

(51) Int. Cl.<sup>7</sup> .............................. B66C 23/78
(52) U.S. Cl. ...................... 212/302; 212/291
(58) Field of Search ................ 212/302, 303, 212/304, 291, 175

(56) References Cited

U.S. PATENT DOCUMENTS

| | | | |
|---|---|---|---|
| 3,338,426 A | | 8/1967 | Grove |
| 3,901,532 A | | 8/1975 | Hornagold |
| 3,963,132 A | * | 6/1976 | Dufour .................. 214/142 |
| 4,027,801 A | * | 6/1977 | Johnston et al. ............ 212/145 |
| 4,053,061 A | * | 10/1977 | Lester .................. 212/291 |
| 4,071,147 A | * | 1/1978 | Hornagold .................. 212/145 |
| 4,216,869 A | * | 8/1980 | Grove .................. 212/165 |
| 4,424,985 A | * | 1/1984 | Holmes .................. 212/189 |
| 5,405,028 A | | 4/1995 | Kaspar |
| 6,138,845 A | * | 10/2000 | Kaspar .................. 212/302 |

FOREIGN PATENT DOCUMENTS

| | | |
|---|---|---|
| DE | 8904010 | 7/1989 |
| DE | 9114464 | 3/1993 |
| DE | 9302376 | 6/1993 |
| DE | 9412217 | 12/1994 |
| DE | 29613415 | 9/1996 |
| DE | 29719953 | 12/1998 |
| EP | 543276 | * 11/1992 |
| JP | 55-106843 | * 8/1980 |
| JP | 4-64596 | * 2/1992 |
| JP | 7-232622 | * 9/1995 |

* cited by examiner

Primary Examiner—Thomas J. Brahan
(74) Attorney, Agent, or Firm—Rothwell, Figg, Ernst & Manbeck (57) ABSTRACT

A crane vehicle is provided with a four-point support comprising outer support members which extend transversely to a longitudinal axis of the vehicle frame and which are supported directly by the vehicle frame. Extendable inner support members are displaceably supported by the outer support members, with each of the free ends of the inner support members having a support cylinder attached to it.

5 Claims, 7 Drawing Sheets

CRANE VEHICLE

The present invention refers to self-propelled crane vehicles of the type referred to in the generic clause of claim 1 and comprises in particular a new frame and support structure which is especially suitable for crane vehicles.

Self-propelled crane vehicles must fulfill a large number of demands in order to be admitted to the traffic on public trunk roads. In Germany the provisions of the StVZO (Road Traffic Licensing Regulations) apply in this respect.

These demands comprise a minimum cruising speed on public roads of 62 km/h and a visual range diameter with a radius $R \leq 12$ m for the driver. To be allowed to travel without being accompanied by the traffic police, the maximum width of the crane vehicle should be less than 3 m. In view of the limited headroom under road bridges, the overall height of the crane vehicle should be $\leq 4.0$ m when the crane vehicle is travelling. Certain limitations exist also with regard to the own weight in view of the limited load-bearing capacity of bridges.

Crane vehicles have a chassis with a stable frame extending in the longitudinal direction of the vehicle and in the middle of the vehicle. In the case of most of the conventional structural designs, the axles of at least two pairs of wheels extend below this frame, part of said pairs of wheels being drivable and steerable. The wheels are secured to the frame with the aid of suitable wheel suspensions.

The frame has also connected thereto the support means which are indispensable for operating the crane and on which the crane vehicle rests when the crane is in operation. In the case of a normal four-point support, four extendable and/or pivotable support beams are provided, each of the free ends of said support beams having attached thereto a hydraulic support cylinder and a supporting plate. The conventional support beams are extended and/or pivoted transversely to the longitudinal axis of the frame to such an extent that there will be sufficient safety against overturning when the crane vehicle is hoisting loads. Normally two support beams which are adapted to be extended in opposite directions are provided in the area of the front end of the vehicle frame and two support beams which are adapted to be extended in opposite directions are provided in the area of the rear end of the vehicle frame.

Above the frame a ball-bearing slewing ring is provided, which rests on said frame and on which the crane superstructure 300 in its entirety is supported. The crane superstructure 300 comprises a frame which is referred to as turntable and which has supported thereon the crane mast (jib) with its articulation member and its telescopic components as well as the luffing gear required for raising the crane mast. It goes without saying that every self-propelled crane vehicle is equipped with suitable driving and steering means for the chassis, drive means for the turntable and means for operating the luffing gear and for extending and retracting the telescopic components as well as for hoisting and lowering loads.

Figure 6:
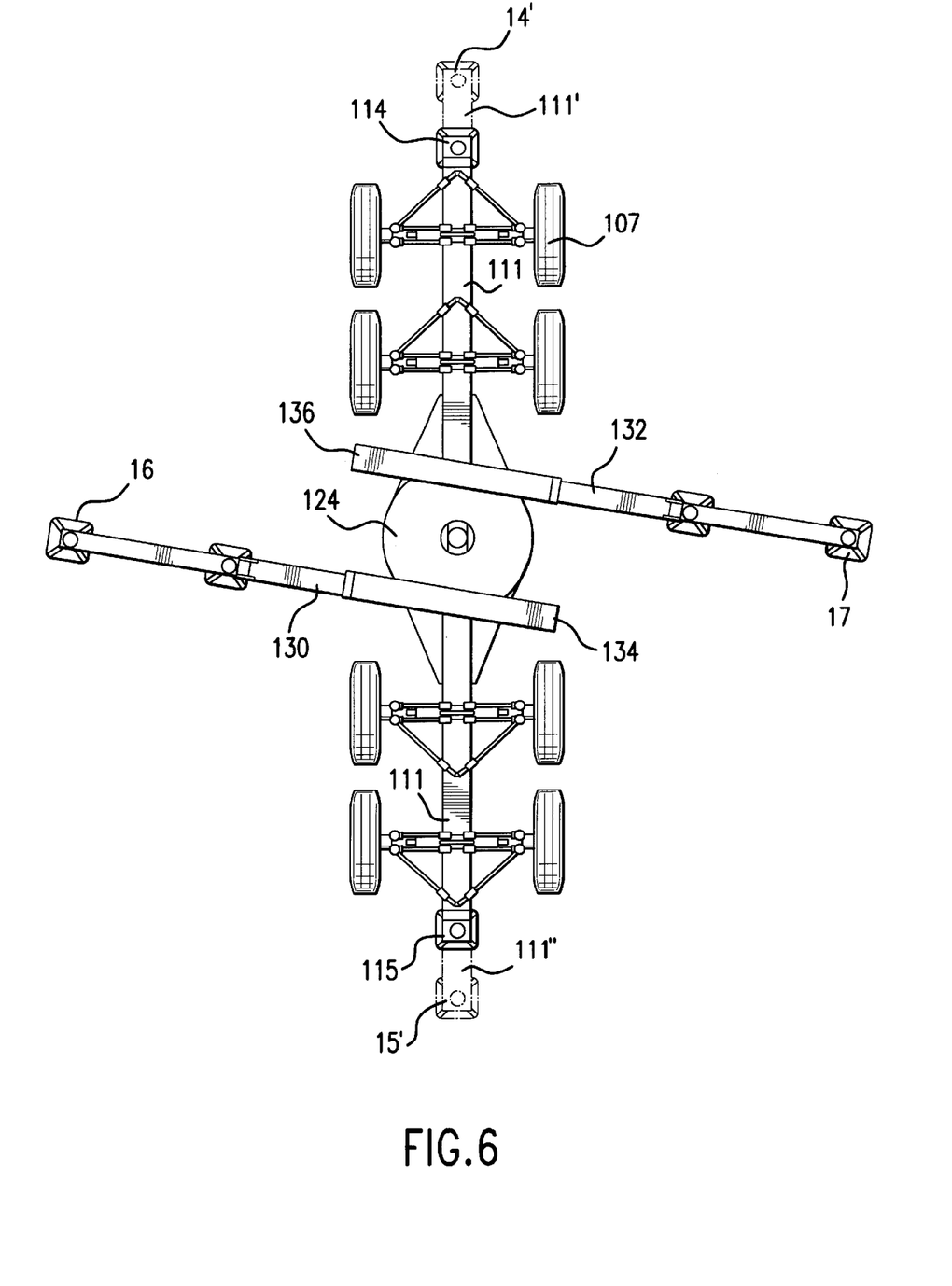
FIG. 6 shows a schematic top view of a four-point support having a conventional structural design.

FIG. 6 shows a four-point support which is suitable especially for crane vehicles designed for loads up to approx. 400 t. The figure shows the vehicle frame 111 which extends in the longitudinal direction of the vehicle and which is provided with a front support means 114 at the front end thereof and with a rear support means 115 at the rear end thereof. The support means 114 and 115 are secured to hydraulically extendable support beams 111' and 111". Each of these support beams can be extended by approx. 1 m in the longitudinal direction of the frame.

In the area where the slewing ring 124 is supported, a left support beam 130 and a right support beam 132 are supported. These two support beams are adapted to be extended from respective reception cases 134 and 136 in opposite directions to the operating positions shown, and they are provided with support means 116 and 117, respectively, at the free ends thereof. The eight wheels of a four-axle crane vehicle are designated by reference numeral 107 in FIG. 6.

When the crane is in operation, each crane vehicle rests on the support cylinders alone, whereas the vehicle wheels are no longer in contact with the ground, the support cylinders absorbing the respective reaction forces.

The known crane-vehicle support according to FIG. 6 offers construction-dependent great advantages, but it is comparatively complicated and expensive as far as production and maintenance is concerned.

Hence, it is the object of the present invention to provide a crane vehicle or rather a four-point support for crane vehicles whose structural design permits in comparison with conventional structural designs simpler production and maintenance.

This object is achieved by the subject matter of claim 1 and the subject matter of claim 6, respectively.

Due to the fact that the undercarriage construction can be very low in the case of the crane vehicle according to the present invention, larger dimensions of the crane mast (jib) can be chosen, which will increase the hoisting capacity without any increase in the overall height of the crane vehicle. To the person skilled in the art it is known that in the case of a crane mast an increase in the flexural strength, i.e. an increase in the load-bearing capacity, can be achieved by increasing the height. The reduction of the own weight that can be accomplished in the area of the undercarriage of the crane vehicle according to the present invention permits an increase of the own weight in the area of the crane superstructure 300, in particular in the area of the crane mast, without increasing the overall weight of the crane vehicle. The reduction of the own weight that can be accomplished by the present invention in the area of the undercarriage can, for example, be utilized for increasing the number of telescopic jib components which can be accommodated in a crane jib of predetermined overall height.

It should here be emphasized that the four-point support having the structural design according to the present invention is suitable not only for crane vehicles of the type described and disclosed in the present application but also for crane vehicles whose jib head has a completely different structural design. The crane jib can e.g. have associated therewith an extandable fire ladder or the jib can be implemented as an extendable fire ladder. In addition, units, such as working platforms etc., can be provided on the free end of the jib.

A characteristic feature of the four-point support according to the present invention is that the support member(s) are not accommodated in special support cases but are accommodated directly in the longitudinal vehicle frame. In the case of extendable (telescopic) support members, it proved to be particularly advantageous when an outer support member in the form of a hollow body is arranged in the longitudinal vehicle frame, either in a stationary or in a displaceable mode of arrangement, and when an inner support member is displaceably supported in said outer support member. The outer free end of this inner support member has provided thereon a support cylinder with a supporting plate.

The support means according to the present invention, in the case of which conventional support cases can be dispensed with, results in a substantial reduction of weight, since the introduction of forces can be optimized with regard to lateral forces and bending. Furthermore, the whole connection of the support members to the longitudinal vehicle frame can be established in a comparatively simple manner.

Preferred embodiments of the present invention are disclosed in the subclaims.

In the following, the present invention will be explained in detail on the basis of embodiments and with reference to the drawing, in which.

Figure 1:
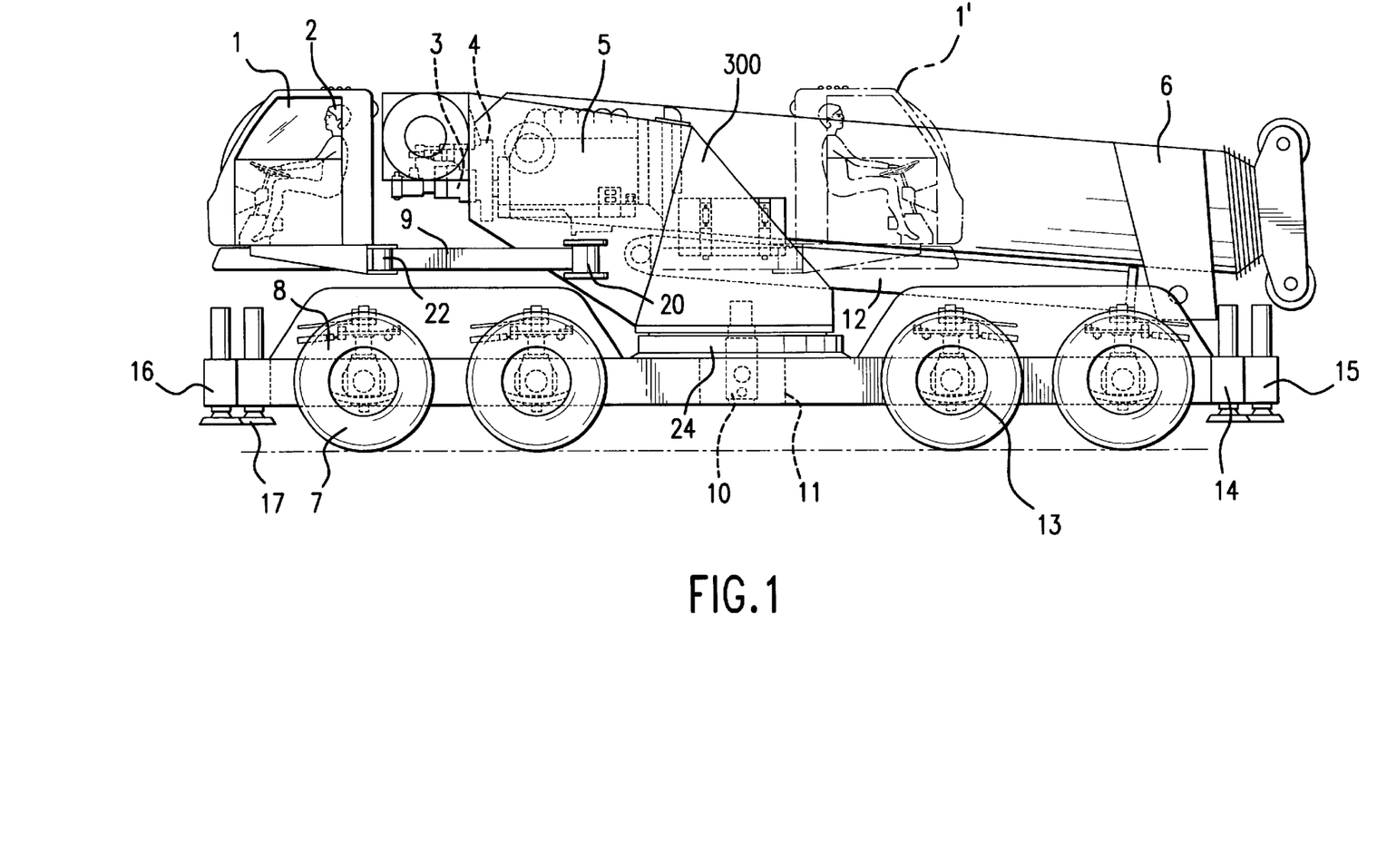
FIG. 1 shows a schematic side view of a four-axle crane vehicle.

FIG. 1 shows a four-axle crane vehicle having the structural design according to the present invention, said crane vehicle being designed for a maximum load of 120 t and having an overall height. (when travelling) of only 3.5 m and an overall length of 10.87 m. The width of the vehicle crane shown is <3 m. The crane vehicle is shown at its driving position, a cabin 1 being represented by solid lines at the front, when seen in the direction of motion. Within the framework of the following description, "rear" means the direction which is opposite to the direction of motion and in which the outer jib end points in FIGS. 1 and 2. The terms "left" and "right" are used in the following description with respect to the direction of motion indicated in FIGS. 2 and 3 by an arrow. Hence, the vehicle wheels shown in FIG. 1 are provided on the "left" side of the vehicle.

An operator 2 is shown in the cabin 1. Reference numeral 3 stands for a hydraulic power pump and reference numeral 4 stands for a pump power divider. A crane mast (jib) designated by reference numeral 6 is pivotably supported in the front area of the vehicle so that the jib end points rearwards. In the embodiment shown, the crane mast comprises an articulation member provided with a plurality of telescopic components accommodated therein. An engine 5 for travelling and for operating the crane is shown as well.

The crane vehicle is provided with four axles having secured thereto a total of eight wheels 7. Each wheel is suspended individually from a frame 11 extending in the longitudinal direction of the vehicle, the individual wheels being suspended by means of a wheel suspension designated by reference numeral 8. Each wheel 7 is equipped with a shiftable hydraulic motor of its own, which is associated with the wheel hub in a manner known per se. At least part of the wheels 7 is steerable with the aid of a schematically shown steering means, said steering means comprising a split steering shaft. This split steering shaft (not shown in detail) is adapted to be unlocked and locked hydraulically and guarantees that a mechanical steering engagement with the steerable wheels exists when the crane vehicle is travelling on public roads. The hydraulic motors (hydrostatic individual wheel drive means), which are preferably integrated in the hubs of the wheels 7, do not need any connection with the vehicle frame 11 through axles, cardan shafts or the like.

The cabin 1 is supported on a turntable together with the pump, the power divider as well as the motor and the crane mast 6, said turntable being schematically shown as a polygon in thick solid lines. Also the luffing gear 12 required for raising the crane mast is supported on said turntable.

The turntable is supported on a slewing ring 24, which is rotatably supported in the vehicle frame 11, so that the rotatable crane superstructure 300 in its entirety is held by the slewing ring 24 in a manner known per se. The cabin 1 is supported on the turntable such that it is horizontally pivotable with the aid of a main pivot 20 and a swivelling arm 9. The cabin 1 can be pivoted from the driving position shown at the left-hand side of FIG. 1 to the position indicated by a dot-and-dash line on the right-hand side of FIG. 1. Between the travelling position and the extreme position designated by reference numeral 1', the cabin 1 can be pivoted to arbitrary positions. An additional pivot 22 is provided so as to allow the operator to view the crane mast exactly when the crane is in operation, at each intermediate position between the two extreme positions shown in the figures. This additional pivot 22 permits horizontal pivoting of the cabin independently of the pivoting of the swivelling arm 9 about the main pivot 20. The additional pivot 22 connects two sub-sections of the swivelling arm 9. At least when the crane vehicle is travelling, the cabin 1 is adapted to be secured to the chassis (vehicle frame 11) by means of bolts.

The upper edge of the slewing ring 24 is located on a comparatively low level and, in any case, it is located below the highest point of the tires of the wheels 7 associated with the chassis. Since the wheels including the tyres for crane vehicles often have a diameter of 1.4 m, the upper edge of the slewing ring 24 will consequently be located at a height of approx. 1.30 m above the contact surface of the tires of the wheels. Assuming a road clearance of 0.4 m for the vehicle frame 11 and a height of 0.5 m for the vehicle frame, a height of approx. 0.9 m is obtained for the lower edge of the slewing ring. Assuming that the height of the slewing ring is 0.30 m, a height of 1.20 m is obtained for the position of the upper edge of the slewing ring. When the luffing gear 12, which is arranged between the upper edge of the slewing ring and the lower edge of the crane mast, is assumed to be 0.4 m high, a height of 1.6 m is obtained for the upper edge of the luffing gear; hence, a height of 1.90 m is still available either for the upper edge of the cabin or for the upper edge of the crane mast before an overall height of 3.5 m is reached. In FIG. 1, the distances between the wheel axles are e.g. 1.7 m. In FIG. 1, the distance between the two inner axles is 4.7 m and the length of the vehicle frame is 10.5 m. The length in its entirety is given as 10.87 m in FIG. 1. It goes without saying that the abovementioned dimensions only refer to a single embodiment. In general, it is only important that, in the case of a crane vehicle designed for a load of 120 t, the upper edge of the slewing ring is lowered to approx. 1.20 to 1.30 m and a weight reduction in the area of the undercarriage (frame and support) can be achieved simultaneously.

Figure 2:
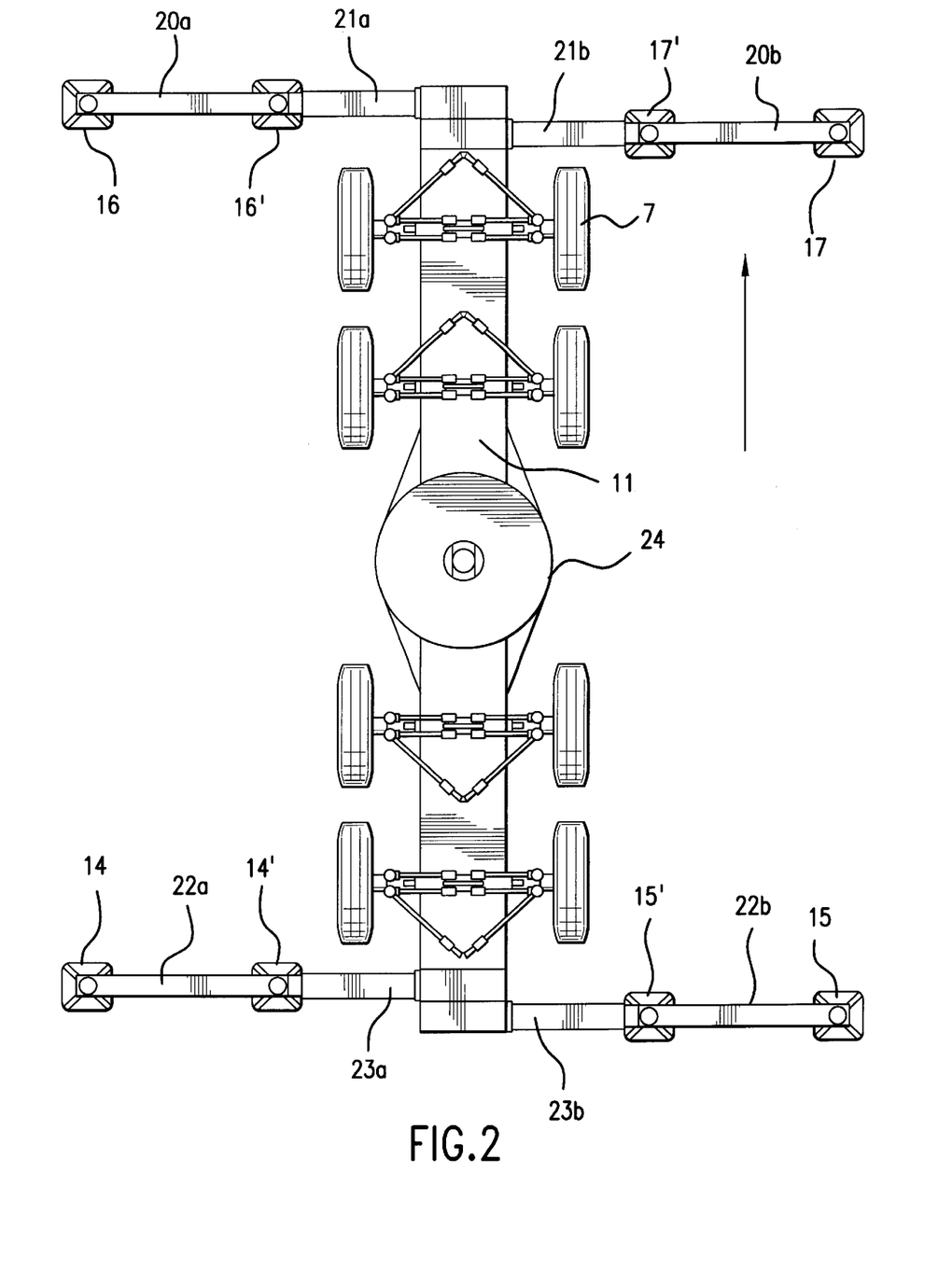
FIG. 2 shows a schematic top view of a first embodiment of the support means according to the present invention.

FIG. 2 shows a top view of the undercarriage of a crane vehicle comprising a longitudinal vehicle frame 11 and a total of four pairs of wheels 7. The area of the slewing ring on which a crane superstructure (not shown in FIG. 2) rests is designated by reference numeral 24. An arrow indicates the normal direction of motion of the crane vehicle. In the area of the front end of the longitudinal vehicle frame 11, a support means 16 in the form of a schematically shown support cylinder 16 is provided on the left-hand side of the longitudinal axis of the vehicle and a support means 17 in the form of a schematically shown support cylinder is provided on the right-hand side of the longitudinal axis of the vehicle. The respective support cylinders 16 and 17 are attached to the ends of displaceable inner support members 20*a* and 20*b*, which are displaceably supported in the interior of outer support members 21*a* and 21*b*. When the inner support members 20*a* and 20*b* have been fully retracted into the outer support members 21*a* and 21*b*, respectively, the left support cylinder 16 will be located at the position designated by reference numeral 16' and the support cylinder 17 will be located at the position designated by 17'.

Analogously to the supporting measures at the front end of the longitudinal vehicle frame 11, additional supporting measures are provided at the rear end of the longitudinal vehicle frame. A support cylinder 14 is provided on the left-hand side of the longitudinal axis of the vehicle and a support cylinder 15 is provided on the right-hand side of the longitudinal axis of the vehicle. These two support cylinders are arranged on the outer free ends of inner support members 22*a* and 22*b*, respectively. These two inner support members are displaceably supported in outer support members 23*a* and 23*b*, respectively. The outer support members 21*a* and 21*b* provided at the front end of the frame as well as the outer support members 23*a* and 23*b* provided at the rear end of the frame are supported directly in the longitudinal vehicle frame without any conventional support case being required. When the inner support members 22*a* and 22*b* provided at the rear end of the frame are retracted as far as possible into the outer support members 23*a* and 23*b*, the support cylinders 14 and 15, respectively, will be located at the operating positions designated by reference numerals 14' and 15' in FIG. 2.

As shown in FIG. 2, a maximum supporting base of 8.1m is achieved in the case of the embodiment shown in said figure, the overall width of the vehicle being 2.75 m.

If the extendable inner support members 20*a*, 20*b*, 22*a*, 22*b* are dispensed with and if the support cylinders 14, 15, 16, 17 are provided at the free ends of the outer support members 21*a*, 21*b*, 23*a*, 23*b*, a base whose width corresponds essentially to that of the vehicle can be obtained.

As will be explained hereinbelow making reference to FIGS. 4 and 5, the above-mentioned outer support members can, in turn, be supported such that they are displaceable in the longitudinal vehicle frame. For all the support members provided in the end sections of the longitudinal vehicle frame within the framework of the present invention, it holds true that they are arranged transversely to the longitudinal axis of the vehicle or rather that they are extendable transversely to the longitudinal axis of the vehicle.

Figure 3:
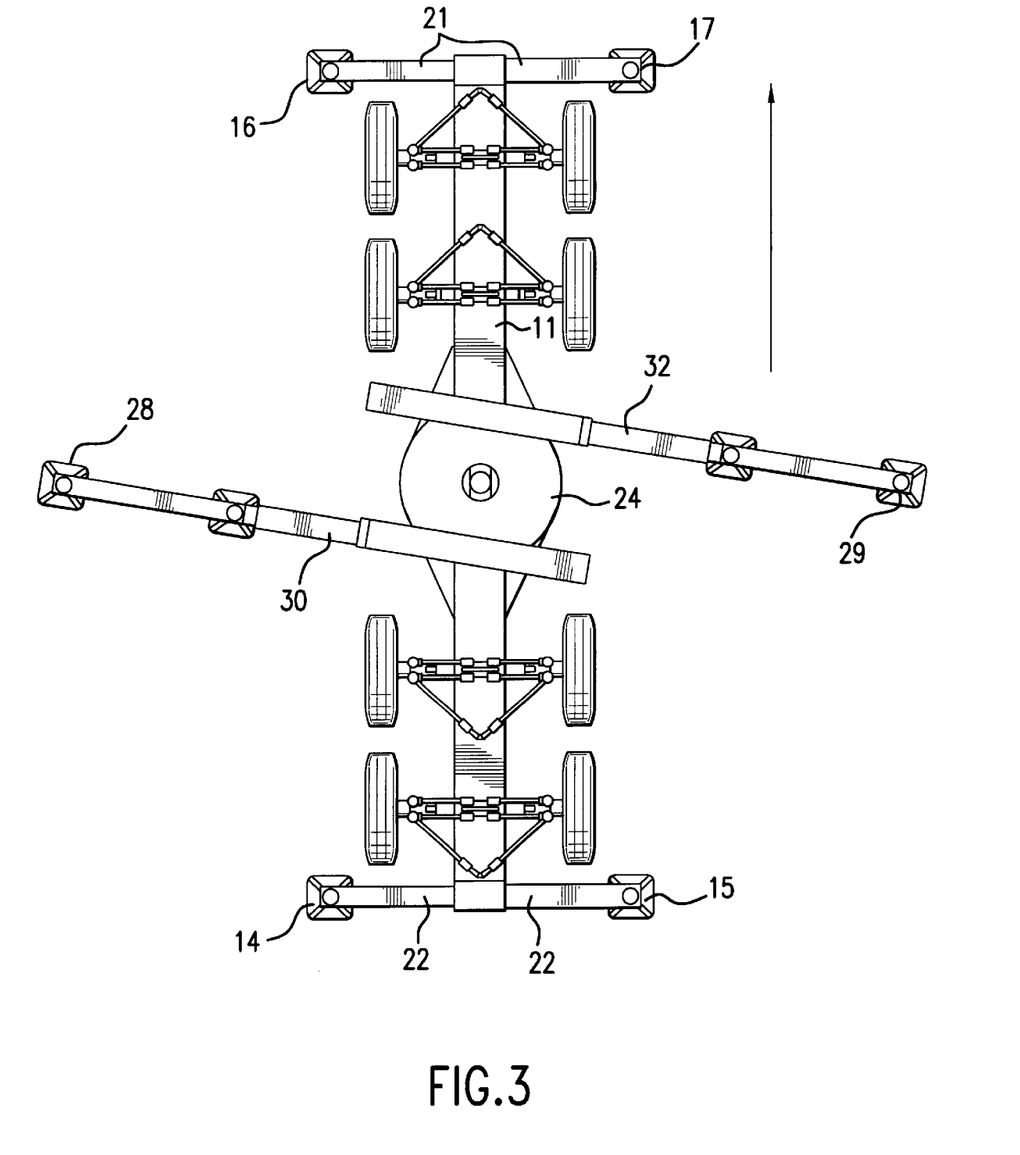
FIG. 3 shows a schematic top view of a second embodiment of the support means according to the present invention.

As far as the support means provided at the two ends of the vehicle frame are concerned, the embodiment shown in FIG. 3 differs from the embodiment shown in FIG. 2 insofar as the support members 21 and 22 according to FIG. 3, which are provided with support cylinders 14, 15, 16, 17 at the free ends thereof, are not extendable. These support members 21 and 22, which are arranged transversely to the longitudinal axis of the vehicle, are supported directly in the longitudinal vehicle frame 11. The fixed-length support members 21 and 22 shown in FIG. 3 can be implemented in one piece or, as is schematically shown in FIG. 3, they can be inserted into one another in the area of the longitudinal vehicle frame 11. According to FIG. 3, the support members 21 and 22 arranged on the left-hand side of the longitudinal axis of the vehicle are smaller in diameter than the support members shown on the right-hand side of the vehicle so that the end sections of the respective left support members can be inserted into the end sections of the respective right support members.

FIG. 3 additionally shows as a preferred embodiment a left support beam 30 and a right support beam 32 in the area where the slewing ring 24 is supported, said two support beams being adapted to be hydraulically extended to the left and to the right in opposite directions. These two support beams 30 and 32 are supported in the longitudinal vehicle frame 11 in the area where the slewing ring is supported. As is schematically shown in the figure, the two support beams 30 and 32 can be extended to an arbitrary extent between a fully retracted and a fully extended position. In the fully extended position an imaginary connecting line between the centres of the support cylinders 28 and 29 attached to the two last-mentioned beams extends through the centre of the slewing ring 24, as shown in FIG. 3 by a dot-and-dash line.

In the embodiment shown in FIG. 3, a supporting base of 3.6 m is obtained with the two permanent support member lengths, whereas the supporting base obtained with the aid of the two additional support beams 30 and 32 is 10 m.

FIG. 4 shows schematically the supporting base variation that can be achieved with the aid of the four-point support implemented according to the present invention.

Figure 4A:
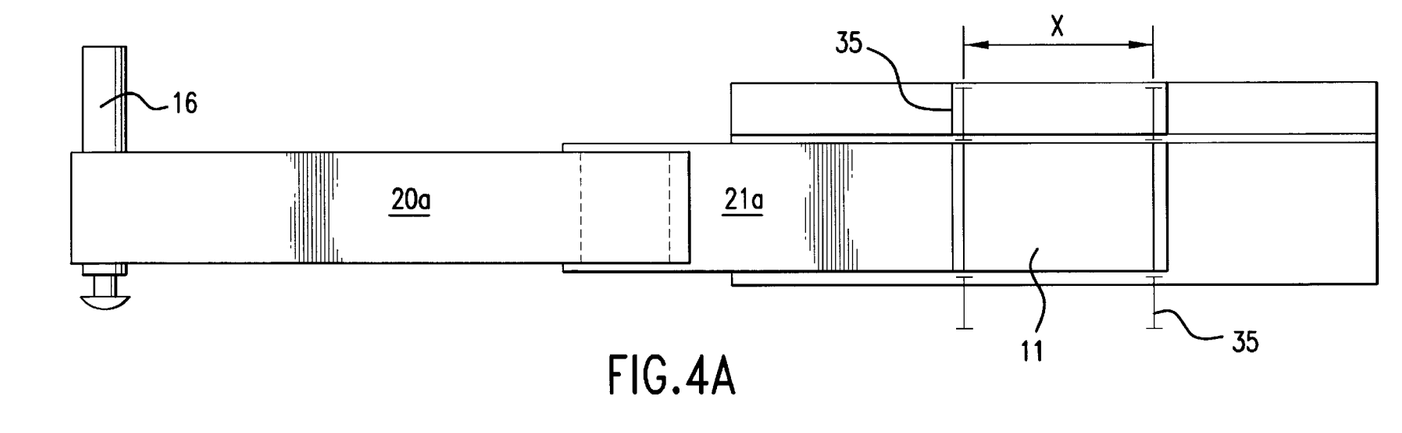
FIG. 4 shows a schematic representation of the supporting bases of different size that can be obtained with the aid of the embodiment shown in FIG. 2.

FIG. 4*a* shows schematically an embodiment of the present invention corresponding essentially to the conditions in FIG. 2. FIG. 4*a* shows an outer support member 21*a* and an inner support member 20*a*, the last-mentioned support member being displaceably supported in the outer support member. At the outer free end of the inner support member 20*a*, a support cylinder designated by reference numeral 16 is schematically shown, a supporting plate being suspended from said support cylinder. The outer support member 21*a* is adapted to be displaced within the longitudinal vehicle frame 11. It goes without saying that an arrangement corresponding to the support members 21*b* and 20*b* according to FIG. 2 is provided on the right-hand side of the longitudinal frame 11.

FIG. 4A shows the maximum supporting base which can be accomplished with the aid of the four-point support according to the present invention.

Figure 4B:
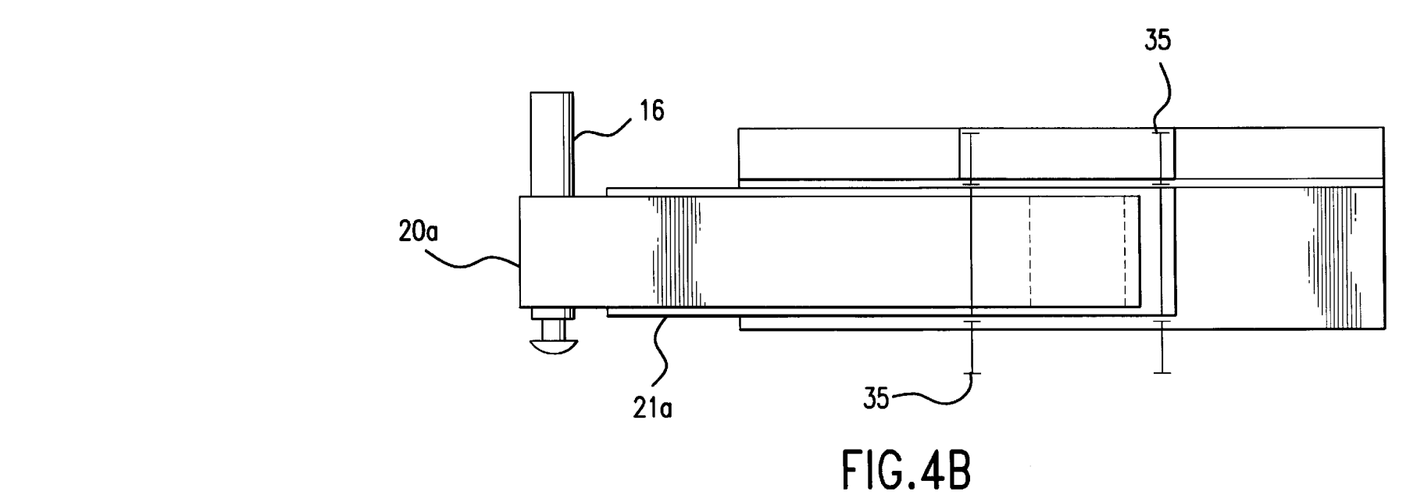

In FIG. 4B the situation is shown in which the inner support member 20*a* has been fully retracted into the outer support member 21*a*. The supporting arrangement 21*b*, 20*b* (FIG. 2) on the right-hand side of the figure is not shown in FIG. 4B either.

From FIG. 4B it can be seen clearly that the supporting base can be reduced to approx. 50% by retracting the inner support member 20*a* into the outer support member 21*a*.

Figure 4C:
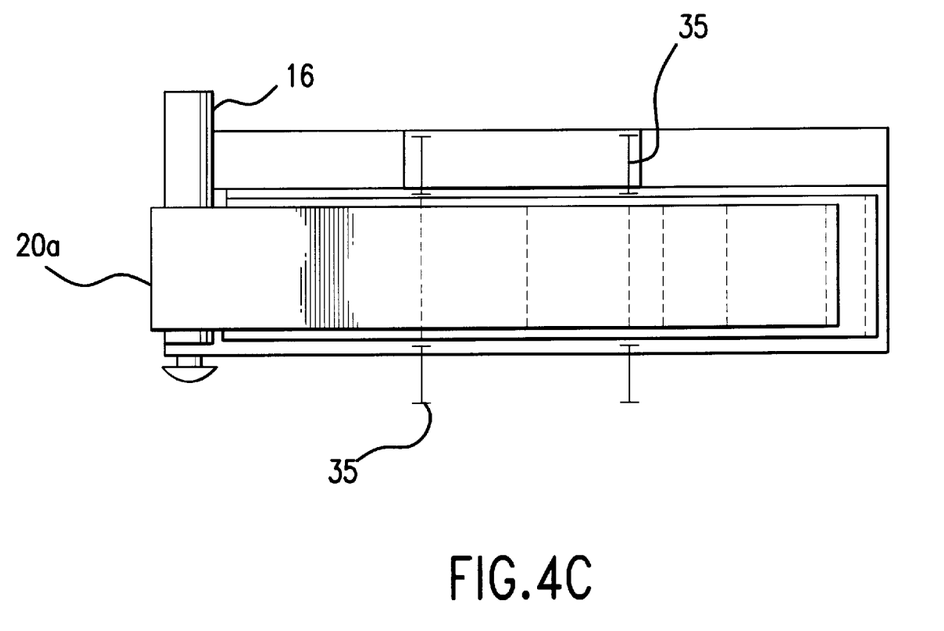

FIG. 4C shows the situation in which the inner support member 20*a* is fully accommodated in the outer support member 21*a* and in which the outer support member 21*a* has been moved to the position where it is retracted as far as possible in the longitudinal vehicle frame. At this position shown in FIG. 4C, the supporting base has reached its smallest dimensions thus defining the vehicle width of e.g. 2.5 m. Also in FIG. 4C an arrangement corresponding to the arrangement 21*b*/20*b* in FIG. 2 should be imagined on the right-hand side.

Reference numeral 35 respectively designates in FIG. 4 lateral-force reinforcement bars, which will be discussed in detail hereinbelow making reference to FIG. 5. The dimensional arrow designated by reference symbol x in FIG. 4A stands for the width of the longitudinal vehicle frame 11.

Figure 5:
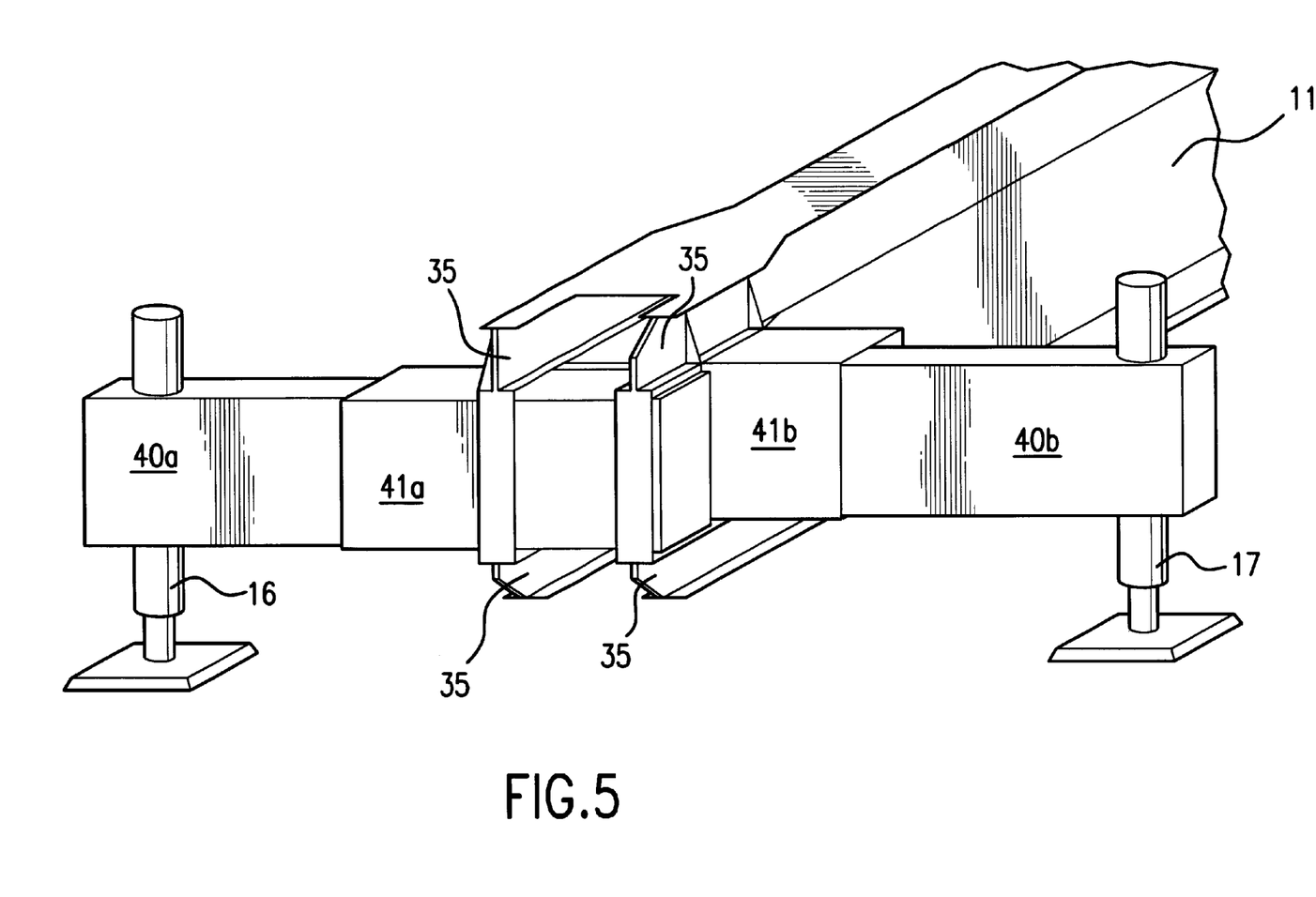
FIG. 5 shows a perspective view of the embodiment shown in FIG. 2.

FIG. 5 shows a preferred embodiment for the arrangement and support of two extendable support members in a longitudinal vehicle frame 11. The figure shows a support cylinder 16 on the left-hand side and a support cylinder 17 on the right-hand side, said support cylinders being arranged on the free ends of the inner support members 40*a* and 40*b*, respectively. The inner support member 40*a* is displaceably supported in an outer support member 41*a* and the inner support member 40b is displaceably supported in an outer support member 41b. The two outer support members 41a and 41b are displaceably received in an opening of the longitudinal vehicle frame 11, said support members 41a, 41b being arranged one behind the other and parallel to one another in the direction of the longitudinal vehicle frame 11.

The fixed portions of the support members 41a and 41b are so arranged as to lie on an extension of the web plates of the longitudinal vehicle frame 11. Bending moments resulting from the contact forces of the support members counteract one another in this composite support member structure. Only the resultant residual bending moment and the lateral force are introduced over a large area into the longitudinal vehicle frame into the webs as well as into the lower chord and the upper chord. Due to the juxtaposed lateral-force reinforcement bars 35, the closed frame is subjected to the lateral force, the bending moment and the torsional movement.

Due to the connection subjected to a tensile load at the end face and between the support members 41a and 41b and the juxtaposed lateral-force reinforcement bars 35, a partial compensation of the deformation forces is accomplished by force introduction from opposite sides through the support member 41a and the support member 41b, respectively.

The operating position of a support means according to the present invention shown in FIG. 5 corresponds essentially to the position of maximum extension of the supporting base shown in FIG. 2 and in FIG. 4A. If the two inner support members 40a and 40b, respectively, which are connected to the support cylinders, were retracted as far as possible into the respective outer support members 41a and 41b in FIG. 5, the supporting situation shown in FIG. 4B with a supporting base of only 50 t would essentially be realized. If the outer support members 41a and 41b were displaced from their positions shown in FIG. 5 towards the longitudinal axis of the vehicle, a situation would be obtained in which the two outer support members 41a and 41b would be positioned one behind the other; the bisecting lines of said outer support members 41a and 41b would then be located one behind the other and in the plane of the midperpendicular of the longitudinal vehicle frame 11, said midperpendicular being shown by a broken line in FIG. 5. In such a situation, the respective ends of the two support members 41a and 41b are located in the same plane and the inner support members 40a and 40b are retracted into the two outer support members as far as possible, whereby the situation shown in FIG. 4C is obtained, in which the two support cylinders 16 and 17 define the vehicle width.

What is claimed is:

1. A crane vehicle comprising:

a vehicle frame, said vehicle frame having a longitudinal axis, said vehicle frame further comprising a chassis;

a slewing ring rotatably supported by said vehicle frame;

a turntable fixedly supported on said slewing ring;

a crane superstructure fixedly supported on said turntable;

a telescopic crane mast pivotably supported by said crane superstructure, said crane mast having a traveling position, wherein it points to a rear of the crane vehicle;

a swiveling arm having a first end and a second end, said second end rotatably supported on said turntable;

a cabin rotatably supported on said first end of said swiveling arm;

a four-point support pivotably connected directly to the vehicle frame, said four point support being used when the crane is in operation;

said four-point support further comprising telescopic support members pivotably connected directly to the vehicle frame, such that said telescopic support members extend transversely to the longitudinal axis of the vehicle frame;

said four-point support being provided with support cylinders secured to support members; and wherein the cabin has a first driving position, at which it is arranged ahead of the crane mast in the direction of driving, and a second operating position where it is disposed in side-by-side relation with the crane mast;

wherein an upper edge of the slewing ring is located below a highest point of a tire of a wheel associated with the chassis;

wherein the cabin is provided for driving the crane vehicle on the road at a speed exceeding 62 km/h as well as for operating the crane.

2. A crane vehicle according to claim 1, further comprising:

a pivot provided between the second end and the first end of the swivelling arm;

wherein said cabin pivots on said pivot.

3. A crane vehicle according to claim 1, wherein:

the cabin is adapted to be fixed in said driving position.

4. A crane vehicle according to claim 1, wherein:

the support members are further comprised of an outer support member supported by the vehicle frame, and an inner support member which is displaceably supported by said outer support member;

each of said inner support members having a free end; and the support cylinders being arranged on the respective free ends of the inner support members.

5. A crane vehicle according to claim 4, wherein:

the outer support members are displaceably supported by the vehicle frame.

* * * * *